United States Patent [19]

Bridenthal et al.

[11] Patent Number: 4,890,414
[45] Date of Patent: Jan. 2, 1990

[54] BOATSIDE BAIT HOLDER

[76] Inventors: George Bridenthal, 321 Walnut Dr., Gas City, Ind. 46933; George Spector, 233 Broadway, Rm. 3815, New York, N.Y. 10007

[21] Appl. No.: 339,514

[22] Filed: Apr. 17, 1989

[51] Int. Cl.[4] .............................................. A01K 97/06
[52] U.S. Cl. ....................................... 43/54.1; 43/57.1; 224/920; 220/259
[58] Field of Search ........................... 43/54.1, 57.1; 224/42.45 R, 282, 920; 206/315.11, 373; 220/259, 337, 343, 94 R, 18

[56] References Cited

U.S. PATENT DOCUMENTS

| 1,827,929 | 10/1931 | Bigelow | 220/259 |
| 2,539,302 | 1/1951 | Fye | 43/54.1 |
| 2,687,834 | 8/1954 | Mathis | 224/920 |
| 3,113,817 | 12/1963 | Imel | 43/54.1 |
| 3,151,790 | 10/1964 | Mavrakis | 224/920 |
| 3,672,548 | 6/1972 | Mavrakis | 224/920 |
| 3,692,202 | 9/1972 | Parlagreco | 220/94 R |

Primary Examiner—Nicholas P. Godici
Assistant Examiner—James R. Miner

[57] ABSTRACT

An artificial fishing bait holder is provided and consists of a container with various compartments and a hingeable lid which is pivotly and removably connected to a mounting bracket. The container includes a carry handle so that it can be transported to other locations when removed from the mounting bracket.

5 Claims, 1 Drawing Sheet

BOATSIDE BAIT HOLDER

BACKGROUND OF THE INVENTION

The instant invention relates generally to fishing equipment and more specifically it relates to an artificial fishing bait holder.

Numerous fishing equipment have been provided in prior art that are adapted to retain tackle, bait and the like. For example, U.S. Pat. Nos. 3,113,817; 3,859,747 and 4,744,614 all are illustrative of such prior art. While these units may be suitable for the particular purpose to which they address, they would not be as suitable for the purposes of the present invention as heretofore described.

SUMMARY OF THE INVENTION

A primary object of the presnt invention is to provide an artificial fishing bait holder that will overcome the shortcomings of the prior art devices.

Another object is to provide an artificial fishing bait holder that when in an open position the artificial fishing bait is readily available therefrom and when in a closed position is stored away until needed again.

An additional object is to provide an artificial fishing bait holder in which the artificial bait container having various compartments can be removed from the mounting bracket and carried away to another location with another mounting bracket and set up again so as to be utilized therefrom.

A further object is to provide an artificial fishing bait holder that is simple and easy to use.

A still further object is to provide an artificial fishing bait holder that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
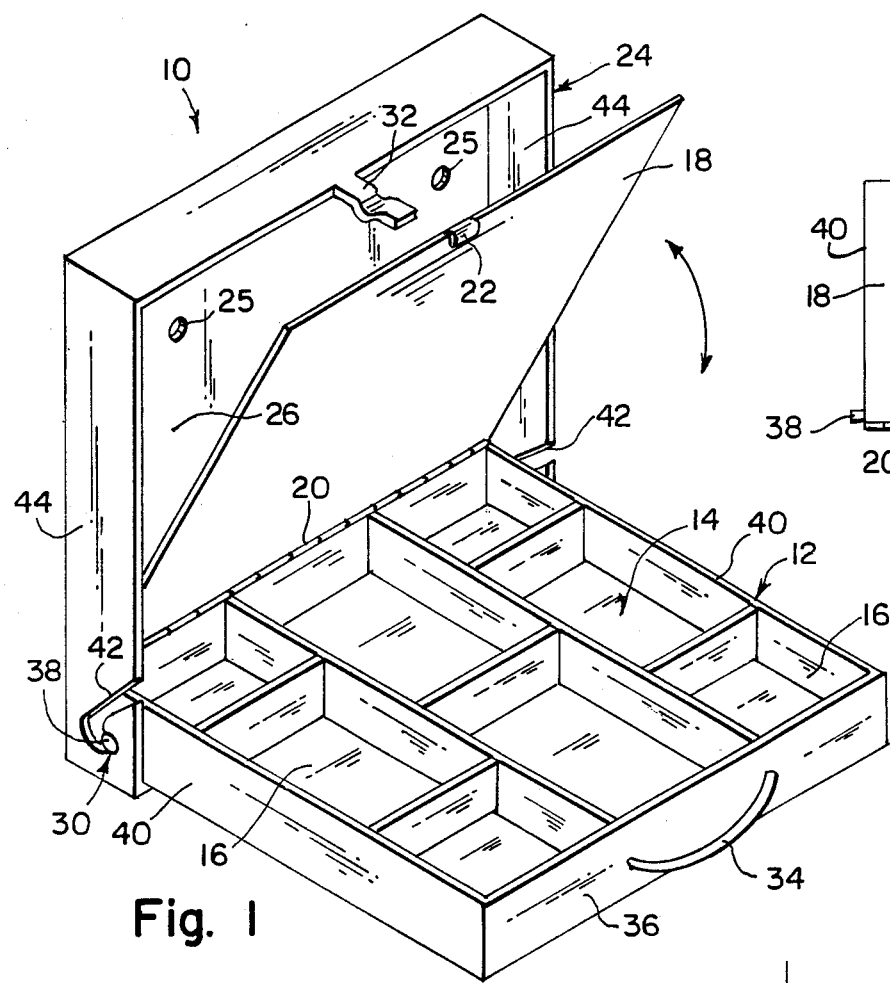
FIG. 1 is a perspective view of the invention in an open position.
Figure 2:
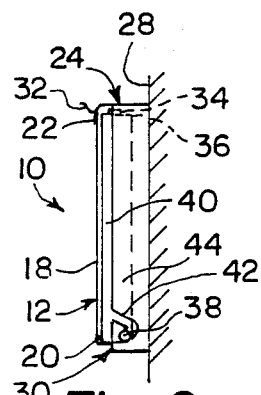
FIG. 2 is a side view thereof in a closed position and mounted to side of a boat.

Turning now descriptively to the drawings, in which similar reference characters denote similar elements throughout the several views, FIGS. 1 and 2 illustrate a holder 10 for artificial fishing bait which consists of a container 12 being box-shaped and has chamber 14 with a plurality of compartments 16 to receive the artificial fishing bait. A lid 18 hinged at 20 to the container 12 is movable between an open position and a closed position to close the chamber 14 against entrance when the lid 18 is in the closed position. A first latch member 22 is formed on the lid 18 opposite the hinge 20 to releasably lock the lid in the closed position until intended force is applied to intentionally move the lid 18 to the open position.

A mounting bracket 24 being box-shaped is provided an is sized to receive the container 12 therein. The mounting bracket 24 has a plurality of apertures 25 in back wall 26 so that it can be attachable and removable from side 28 of a boat with the fasteners (not shown).

Figure 3:
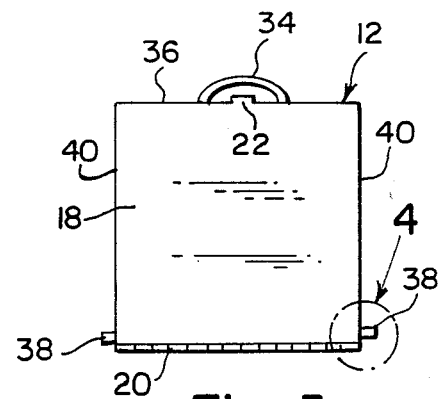
FIG. 3 is a front view of the bait container removed from the mounting bracket.

A structure 30 is for removably and pivotly attaching the container 12 opposite the first latch member 22 to the mounting bracket 24 in such a way so that the container 12 can pivot down into a usable condition and up into a stored condition. A second latch member 32 is formed on the mounting bracket 24 opposite the pivotly attaching structure 30 to releasably lock the container 12 in the stored condition until intended force is applied to intentionally move the container 12 to the usable condition. A carry handle 34 is carried on end 36 of the container 12 opposite the hinge 20 so that when the container 12 is removed from the mounting bracket 24 as shown in FIG. 3, the container can be transported to other locations.

The pivotly attaching structure 30 includes a pair of stub shafts 38, each carried on one side 40 of the container 12 adjacent the hinge 20. The mounting bracket 24 has a pair of J-shaped curved slots 42, each angularly extending inwardly from one side 44 opposite from the second latch member 32 so as to receive one of the stub shafts 38.

Figure 4:
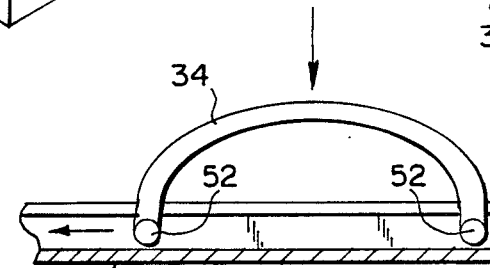
FIG. 4 is an enlarged detail view in section as indicated by arrow 4 in FIG. 3 showing an adjustable stub shaft for various sized bait containers.

As shown in FIG. 4, each of the stub shafts 38 can include an externally threaded portion 46 and an internally threaded cap member 48 which threadably engages with the externally threaded portion 46. The cap member 48 is adjustable to compensate for the container 12 of a smaller size thereof.

Figure 5:
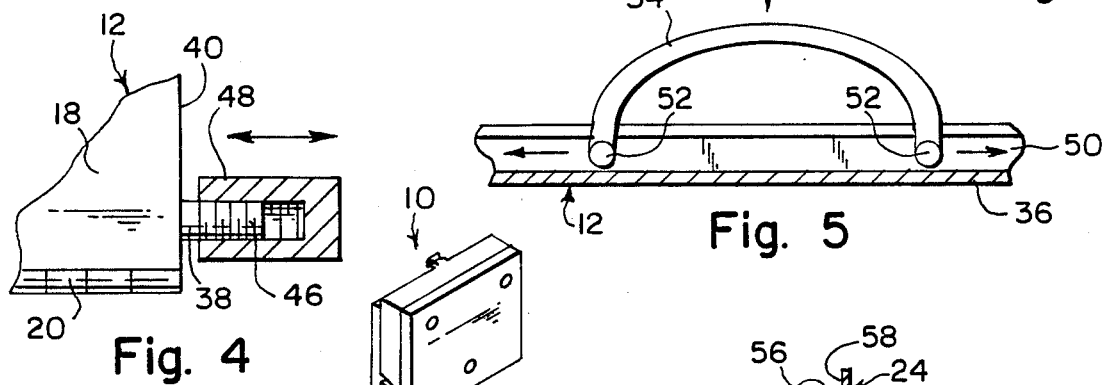
FIG. 5 is an enlarged detail view of a collapsible carry handle which rides within a track in end of the bait container.

As shown in FIG. 5, the end 36 of the container 12 opposite the hinge 20 can have a slotted track 50 therein. The carry handle 34 has a pair of guide members 52 to ride within the slotted track 50 so that the carry handle 34 will collapse when the container 12 is in the stored condition.

Figure 6:
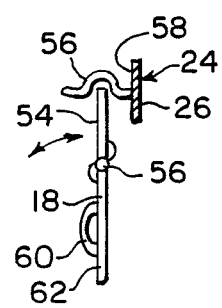
FIG. 6 is a partial side view with parts in section of a lid that is spring hinged so as to engage with a latch inside the mounting bracket which holds the lid secured therein.

As shown in FIG. 6, a distal end 54 is provided for the lid 18. A spring hinge 56 is mounted between the distal end 54 and rest of the lid 18. A third latch member 56 is carried on inner surface 58 of the back wall 26 of the mounting bracket 24 to releasably lock the lid 18 thereto until intended force is applied to intentionally move the lid 18 therefrom. A grip member 60 is mounted to inner surface 62 of the lid 18 so that the grip member 60 can be manually pulled allowing the distal end 54 to pivot on the spring hinge 56 causing the lid 18 to move away from the inner surface 8 of the mounting bracket 24.

Figure 7:
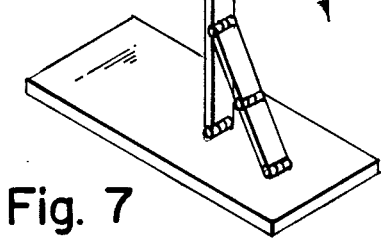
FIG. 7 is a perspective view of a fold down stand for the mounting bracket.

As shown in FIG. 7, a fold down stand 64 is provided for the mounting bracket 24 to be connected thereto instead of the side 28 of the boat thereby making the holder 10 completely portable.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A holder for artificial fishing bait which comprises:
   (a) a container being box-shaped and having a chamber with a plurality of compartments to receive the artificial fishing bait;
   (b) a lid hinged to said container movable between an open position and a closed position to close the chamber against entrance when said lid is in the closed position;
   (c) a first latch member formed on said lid opposite the hinge to releasably lock said lid in the closed position until intended force is applied to intentionally move said lid to the open position;
   (d) a mounting bracket being box-shaped and sized to receive said container therein, said mounting bracket attachable to and removable from side of a boat;
   (e) means for removably and pivotly attaching said container opposite said first latch member to said mounting bracket in such a way so that said container can pivot down into a usable condition and up into a stored condition, wherein said means for removably and pivotly attaching said container includes:
      (a) a pair of stub shafts, each carried on one side of said container adjacent the hinge; and
      (b) said mounting bracket having a pair of J-shaped curved slots, each angularly extending inwardly from one side opposite from said second latch member so as to receive one of said stub shafts;
   (f) a second latch member formed on said mounting bracket opposite said pivotly attaching means to releasably lock said container in the stored condition until intended force is applied to intentionally move said container to the usable condition; and
   (g) a carry handle carried on end of said container opposite the hinge so that when said container is removed from said mounting bracket, said container can be transported to other locations.

2. A holder as recited in claim 1, wherein each of said stub shafts includes:
   (a) an externally threaded portion; and
   (b) an internally threaded cap member which threadably engages with said externally threaded portion so as to be adjustable to compensate for said container of a smaller size thereof.

3. A holder as recited in claim 2, further comprising:
   (a) said end of said container opposite the hinge having a slotted track therein; and
   (b) said carry handle having a pair of guide members to ride within said slotted track so that said carry handle will collapse when said container is in the stored condition.

4. A holder as recited in claim 3, further comprising:
   (a) a distal end provided for said lid;
   (b) a spring hinge mounted between said distal end and the rest of said lid;
   (c) a third latch member carried on inner surface of back wall of said mounting bracket to releasably lock said lid thereto until intended force is applied to intentionally move said lid therefrom; and
   (d) a grip member mounted to inner surface of said lid so that said grip member can be manually pulled allowing said distal end to pivot on said spring hinge causing said lid to move away from the inner surface of said mounting bracket.

5. A holder as recited in claim 4, further comprising a fold down stand for said mounting bracket to be connected thereto, thereby making said holder completely portable.

* * * * *